US008868265B2

(12) United States Patent
Koukol et al.

(10) Patent No.: US 8,868,265 B2
(45) Date of Patent: Oct. 21, 2014

(54) SYSTEM AND METHOD FOR ALIGNING AIRCRAFT AND RUNWAY HEADINGS DURING TAKEOFF ROLL

(75) Inventors: Ondrej Koukol, Prague (CZ); Tomas Beda, Prague (CZ); Jan Lukas, Melnik (CZ)

(73) Assignee: Honeywell International Inc., Morristown, NJ (US)

( * ) Notice: Subject to any disclaimer, the term of this patent is extended or adjusted under 35 U.S.C. 154(b) by 436 days.

(21) Appl. No.: 13/307,621

(22) Filed: Nov. 30, 2011

(65) Prior Publication Data

US 2013/0138273 A1 May 30, 2013

(51) Int. Cl.
*G05D 1/00* (2006.01)

(52) U.S. Cl.
USPC ............ 701/15

(58) Field of Classification Search
None
See application file for complete search history.

(56) References Cited

U.S. PATENT DOCUMENTS

| | | | |
|---|---|---|---|
| 3,651,582 | A | 3/1972 | Lavarenne |
| 5,677,685 | A | 10/1997 | Coirier et al. |
| 5,719,567 | A | 2/1998 | Norris |
| 5,745,863 | A | 4/1998 | Uhlenhop et al. |
| 6,157,876 | A | 12/2000 | Tarleton, Jr. et al. |
| 6,311,108 | B1 | 10/2001 | Ammar et al. |
| 6,571,166 | B1 | 5/2003 | Johnson et al. |
| 7,113,202 | B2 | 9/2006 | Konya |
| 7,196,329 | B1 | 3/2007 | Wood et al. |
| 7,364,121 | B2 | 4/2008 | Firuz et al. |
| 7,382,284 | B1 | 6/2008 | Armstrong |
| 7,965,202 | B1 | 6/2011 | Chiew et al. |
| 7,965,223 | B1 | 6/2011 | McCusker |
| 7,983,838 | B1 | 7/2011 | Mislan |
| 8,019,529 | B1 | 9/2011 | Sharma et al. |
| 2004/0167685 | A1 | 8/2004 | Ryan et al. |
| 2005/0190079 | A1 | 9/2005 | He |
| 2005/0232512 | A1 | 10/2005 | Luk et al. |
| 2007/0240056 | A1 | 10/2007 | Pepitone |
| 2007/0241935 | A1 | 10/2007 | Pepitone et al. |
| 2009/0018713 | A1 | 1/2009 | Coulmeau et al. |
| 2010/0106356 | A1 | 4/2010 | Trepagnier et al. |
| 2010/0207026 | A1 | 8/2010 | Kerr |
| 2010/0250030 | A1 | 9/2010 | Nichols et al. |
| 2011/0063445 | A1 | 3/2011 | Chew |

OTHER PUBLICATIONS

EP Search Report for EP 12 193 244.6 dated Apr. 9, 2013.
EP Office Action for EP 12 193 244.6 dated Apr. 23, 2013
EP Communication, EP 12 193 244.6 dated Aug. 22, 2013.

*Primary Examiner* — Mussa A Shaawat
(74) *Attorney, Agent, or Firm* — Ingrassia Fisher & Lorenz, P.C.

(57) ABSTRACT

An aircraft system and method provide visual input to a pilot during takeoff roll. A runway centerline line vector is determined from a captured image, a displacement of the aircraft from the centerline line vector and an aircraft line vector are determined from the image based on the knowledge of sensor characteristics. The runway centerline line vector and the aircraft line vector are displayed to indicate a direction in which the pilot may change heading to maintain the aircraft on the runway.

25 Claims, 4 Drawing Sheets

SYSTEM AND METHOD FOR ALIGNING AIRCRAFT AND RUNWAY HEADINGS DURING TAKEOFF ROLL

FIELD OF THE INVENTION

The present invention generally relates to a system for improving aircraft orientation during take-off roll and more particularly to a system for improving a pilot's heading control with respect to the runway during takeoff roll.

BACKGROUND OF THE INVENTION

It is important that aircraft maintain a correct course during all stages of flight, including during takeoff roll on a runway. To perform the takeoff roll properly, the aircraft generally accelerates on the runway within an envelope of course and acceleration. The course limits include, for example, the ability to stay in, or nearly in, the center of the runway. A departure outside of this envelope can result in an undesirable positioning of the aircraft with respect to the runway.

In some instances visibility may be poor during takeoff operations, resulting in what is known as instrument flight conditions. During instrument flight conditions, pilots rely on instruments, rather than visual references, to navigate the aircraft. Even during good weather conditions, pilots may rely on instruments to some extent during the takeoff. Some airports and aircraft include runway assistance positioning systems, for example a localizer, to help guide aircraft during takeoff operations. These systems allow for the display of a lateral deviation indicator to indicate aircraft lateral deviation from the departure course.

Current takeoff operations under low visibility conditions are limited by runway visual range limits (RVR). If the RVR is below these limits, the takeoff is not allowed (the pilot must be able to immediately return for a landing if an emergency occurs). A localizer signal may be used under low RVR to avoid deviations from the departure (runway) heading. However, a localizer for assisting pilots during takeoffs has limitations, for example, the necessity to maintain the localizer sensitivity area clear and many airports do not provide a localizer adequately positioned for departure.

Accordingly, it is desirable to provide additional guidance to the pilot by an enhanced vision system when a reliable localizer is not available, thereby improving the ability to fly low visibility takeoffs from a larger number of airports. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system and method is disclosed that will allow pilots to improve heading control during takeoff roll, especially when the visibility is poor, using an enhanced vision system or combined vision system.

In a first exemplary embodiment, an aircraft vision system in an aircraft taking off on a runway having left and right edges comprises a sensor configured to capture an image of the runway; a processor coupled to the navigation system and the sensor and configured to determine a centerline line vector of the runway; determine a runway heading from the centerline line vector; determine deviation of the aircraft heading from the runway heading; and create an aircraft line vector representing the aircraft heading; and a display coupled to the processor and configured to display the centerline line vector and the aircraft line vector.

A second exemplary embodiment comprises an aircraft vision system for maintaining aircraft positioning on a runway during takeoff, the aircraft vision system comprising a sensor configured to capture an image of the runway including at least one of runway edges, runway edge lights, and runway centerline lights; a processor coupled to the navigation system and the sensor and configured to enhance the image; determine a centerline line vector of the runway based on the one of runway edges, runway edge lights, and runway centerline lights; determine a runway heading from the centerline line vector; and create an aircraft vector representing the aircraft heading; and a display coupled to the processor and configured to display the centerline line vector and the aircraft line vector.

A third exemplary embodiment comprises a method for displaying an aircraft runway environment in an aircraft, comprising capturing an image of the runway having left and right edges; determining a centerline line vector of the runway; determining a runway heading from the centerline line vector; determining a deviation of the aircraft heading from the runway heading; creating an aircraft line vector representing the aircraft heading; and displaying the centerline line vector and the aircraft line vector.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A system and method is disclosed that will allow pilots to improve heading control during takeoff roll, especially when the visibility is poor, using an enhanced vision system or combined vision system. The sensed runway edges, runway edge lighting, and/or runway centerline lighting is utilized in lieu of pilot visual detection of external visual references of the takeoff environment. As the takeoff roll progresses and the remaining runway becomes shorter, the pilot's visual acquisition of the runway decreases. The vision system described herein senses, for example, with an infrared camera, at least one of centerline lights, the edges of the runway, and the runway edge lights.

A runway centerline line vector is determined from the sensed image, and a runway heading is determined from the runway centerline line vector. Although the aircraft heading can be determined from a navigation system, this is not guaranteed to be precise to allow for proper positioning on the runway. Therefore, given that the position of the sensor on the aircraft is known, it is known where the centerline should be on the sensor image if the aircraft were properly aligned. Therefore, the deviation of the aircraft from the runway centerline (both angular and shift) is determined from the sensed image and an aircraft line vector is created representing the aircraft heading. The runway centerline line vector and aircraft line vector are then displayed. In a preferred exemplary embodiment, the runway centerline line vector comprises a first portion, and a second portion aligned with, and spaced from, the first portion. The inner part of the runway centerline line vector is positioned between the first and second portions, and aligned with the first and second portions when the aircraft is on the runway centerline. The aircraft position offset from the runway centerline is indicated by a misalignment of the inner runway centerline line vector and the first and second portions. When the runway is positioned on the left from the aircraft, the inner part of the indicator is also positioned on the left, when the runway is on the right, the inner indicator is positioned also on the right from the first and the second portion Additionally, when the aircraft heading is less than the runway heading, the runway centerline line vector indicator is aimed to the right, and when the aircraft heading is greater than the runway heading, the runway centerline line vector indicator is aimed to the left direction.

Figure 1:
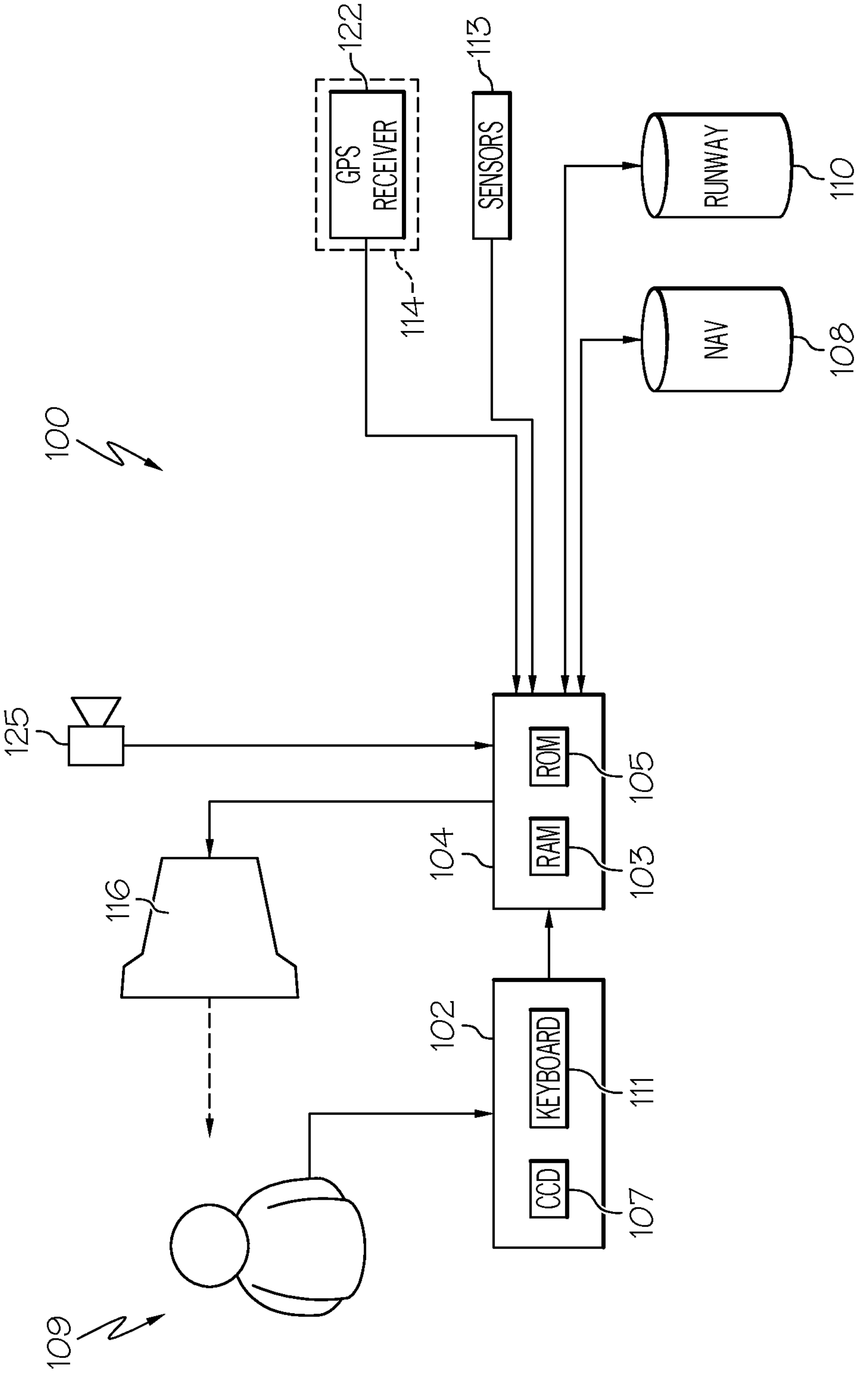
FIG. 1 is a functional block diagram of a flight display system according to an exemplary embodiment.

Referring to FIG. 1, an exemplary flight deck display system is depicted and will be described. The system 100 includes a user interface 102, a processor 104, one or more navigation databases 108, one or more runway databases 110, various navigation sensors 113, various external data sources 114, one or more display devices 116, and the imaging sensor 125. In some embodiments, the imaging sensor 125 can be an electro-optical camera, an infrared camera, a millimeter-wave imager, or an active radar, e.g. millimeter-wave radar. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the sensor 125 and the display device 116, and is coupled to receive data about the installation of the imaging sensor 125 on the aircraft. In one embodiment, this information can be hard-coded in the ROM memory 105. In another embodiment, this information can be entered by a pilot. In yet another embodiment, an external source of aircraft data can be used. The information about the installation of the sensor 125 on board may say, for example, that it is forward looking and aligned with the main axis of the aircraft body in the horizontal direction. More precise information may be provided, such as but not limited to, detailed information about sensor position in the aircraft reference frame, or sensor projection characteristics.

The processor 104 is further configured, in response to the data obtained from sensor 125 and the data about the installation of the sensor on the aircraft, to detect the runway heading and its deviation from the aircraft heading. The preferred means how the runway heading and deviation from aircraft heading is detected will be described further below. Based on the detected heading deviation (angular and offset), the processor 104 is further configured to supply appropriate display commands to the display device 116. The display device 116, in response to the display commands, selectively renders various types of textual, graphic, and/or iconic information.

In order to improve performance of the runway alignment system, the processor 104 may be also configured to receive additional information, which is not necessary for the basic functioning of the system, but that may either improve the detection of the deviation or provide additional context to make the information rendered on the display device 116 more useful.

In one embodiment, the processor 104 may receive navigation information from navigation sensors 113 or 114, identifying the position of the aircraft on selected runway. This navigation information identifies the runway where take-off is taking place. In some embodiments, information from navigation database 108 may be utilized during this process. Alternatively, runway identification can be entered by a pilot 109 via the input device 102. Having information about the runway, the processor 104 can be further configured to receive information from runway database 104. In some embodiments, it may receive information of the runway width and whether centerline lights are present on the runway. This information can make detection of the deviation of the runway heading from the aircraft heading more reliable and it may be utilized during information rendering on display device 116.

In some embodiments, the runway and aircraft heading deviation detection system is closely integrated within either an Enhanced Vision System (EVS) or a Combined Vision System (CVS), in particular, the imaging sensor 125 comprises the EVS sensor, the processor 104 comprises an EVS or CVS processor, and the display device 116 comprises an EVS or a CVS display. In this case, the display device 116 can combine EVS or CVS information with runway and aircraft heading deviation to selectively render various types of textual, graphic, and/or iconic information. The EVS or CVS system may also use other data sources that are not needed for the runway and aircraft heading deviation detection system, such as terrain database, obstacle database, etc.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation databases 108 and the runway databases 110 are, for clarity and convenience, shown as being stored separate from the processor 104, all or portions of either or both of these databases 108, 110 could be loaded into the RAM 103, or integrally formed as part of the processor 104, and/or RAM 103, and/or ROM 105. The databases 108, 110 could also be part of a device or system that is physically separate from the system 100. The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a flight director and a navigation computer, just to name a couple. However, for ease of description and illustration, only a global position system (GPS) receiver 122 is depicted in FIG. 1. The GPS receiver is the most common embodiment of Global Navigation Satellite System (GNSS). In other embodiments, other GNSS systems, for example but not limited to Russian GLONASS or European Galileo, including multi-constellation systems may be used.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
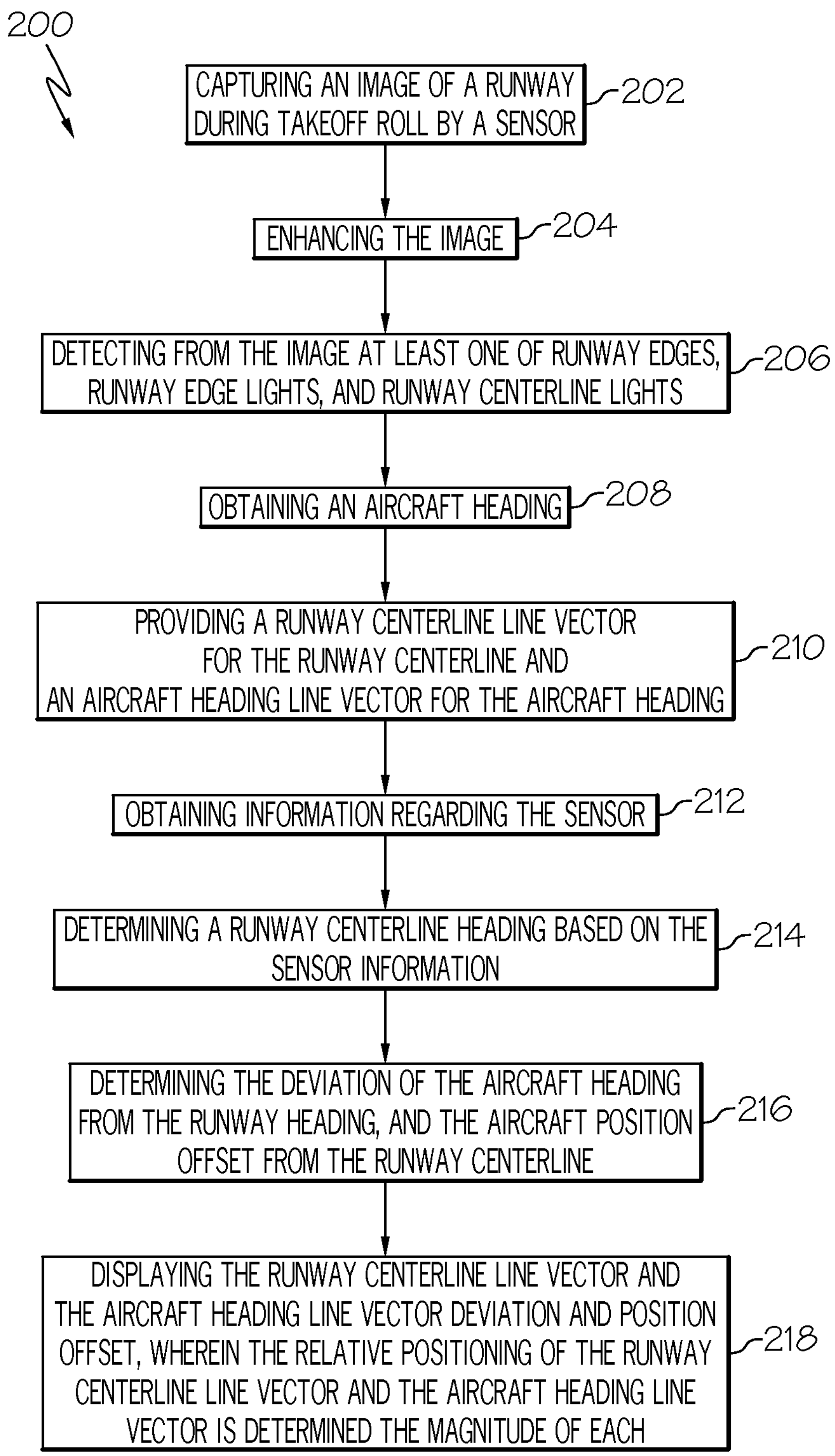
FIG. 2 is a flow chart of the steps illustrating an exemplary embodiment.

FIG. 2 is a flow chart that illustrates an exemplary embodiment that will allow pilots to improve heading control during takeoff roll, especially when the visibility is poor, using an enhanced vision system. The various tasks performed in connection with method 200 may be performed by software, hardware, firmware, or any combination thereof. For illustrative purposes, the following description of method 200 may refer to elements mentioned above in connection with FIG. 1. In practice, portions of method 200 may be performed by different elements of the described system, e.g., a processor, a display element, or a navigation system. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact.

Figure 3:
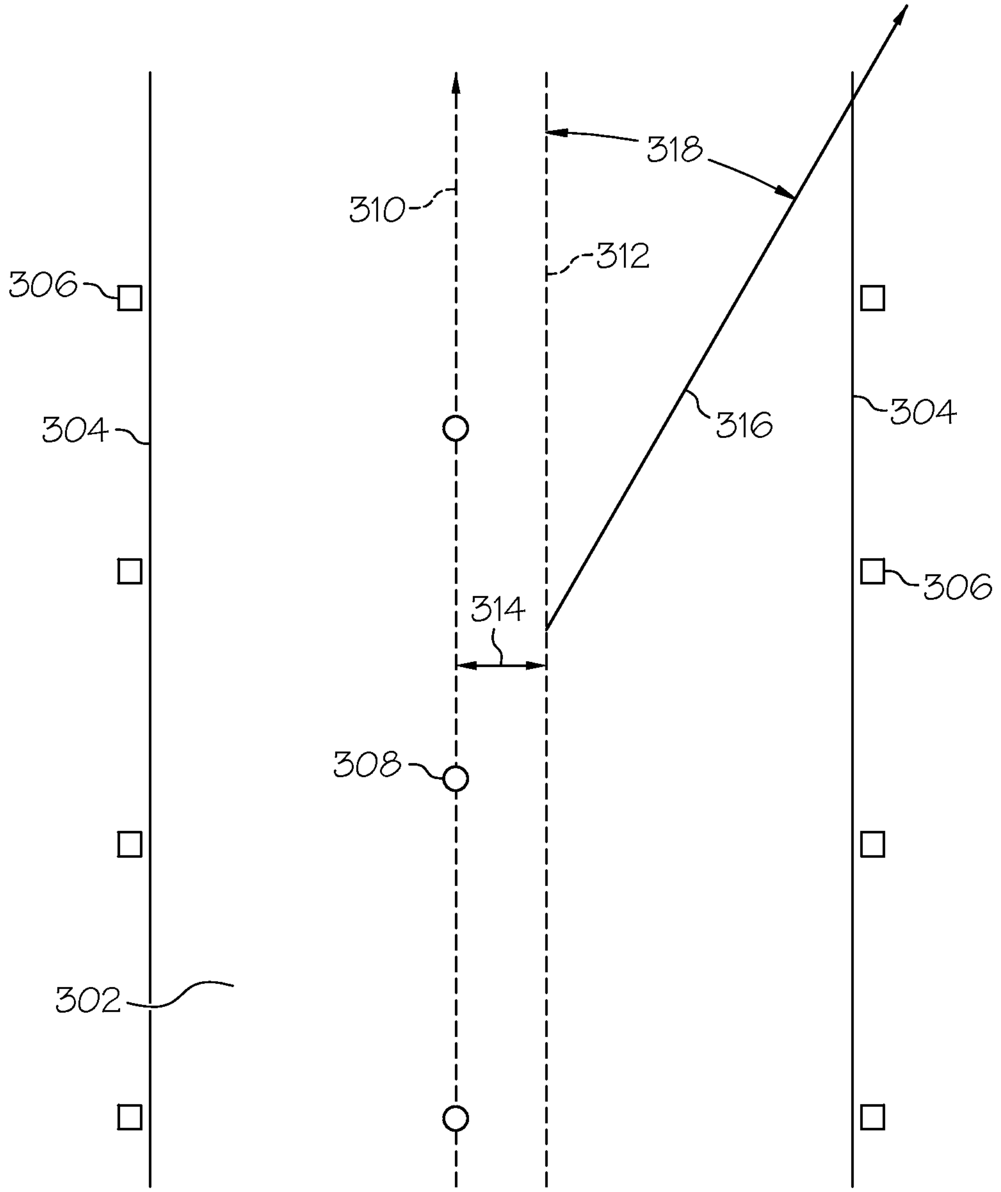
FIG. 3 is a schematic top view of a runway and a takeoff course of an aircraft for an exemplary embodiment.

Referring to FIGS. 2 and 3, the method includes continually capturing 202 an image of a runway 302 during takeoff roll. The capturing may be accomplished by an imaging sensor 125 of FIG. 1, for example, an infrared camera. The image is optionally enhanced 204 by image processing algorithms in the processor 104. The image processing may include, for example, noise reduction, image sharpening, edge enhancement, and dynamic range adjustments. At least one of runway edges 304, runway edge lights 306, and runway centerline lights 308 are detected 206 from the image. This detection 206 of the runway features uses computer vision/image processing algorithms, for example, thresholding, segmentation, and dedicated feature detection algorithms, such as, but not limited to, Hough transform based methods. A runway centerline line vector 310 for the runway centerline is obtained in step 210. When edge lights (forming lines) or directly edge lines are detected, the central line is interpolated from them as a line exactly in the middle of detected left and right lines. When centerline lights are detected directly as well, the exact location of the centerline might be estimated, e.g., by averaging or different mathematical estimation technique, or a detected centerline might be used.

Information about the sensor 125 installation on the aircraft is obtained 212. This information determines the location of the runway centerline within the image when the aircraft is properly aligned. This ideal location is typically identical with the aircraft heading vector. In most embodiments, this ideal location of the runway centerline will be identical with a vertical line dividing the image on two halves.

This way, an aircraft heading line vector 316 for the aircraft heading is provided 210, and a runway centerline heading is determined 214. The angular deviation 318 of the aircraft heading from the runway centerline line vector and the position offset 314 of the aircraft from the runway centerline is determined 214. The angular deviation 318 of the aircraft heading from the runway centerline line vector and the position offset 314 of the aircraft from the runway centerline is determined 216 from displacement of the actual centerline detected in the image from the expected location of the centerline. Offset can be determined accurately only when either more precise information about sensor location on the aircraft is available or sensor projection characteristics are available or runway width is provided. This additional information fixes the ambiguity in offset scale. Nevertheless, even when this additional information is not available, the system is still capable computing offset deviation that differs only by a multiplicative constant. Therefore, the system accurately indicates whether the deviation is getting worse or the position of the aircraft on the runway is improving. The runway centerline line vector 310, the aircraft heading line vector deviation 318 and the position offset 314 from the runway centerline are displayed 218.

Figure 4:
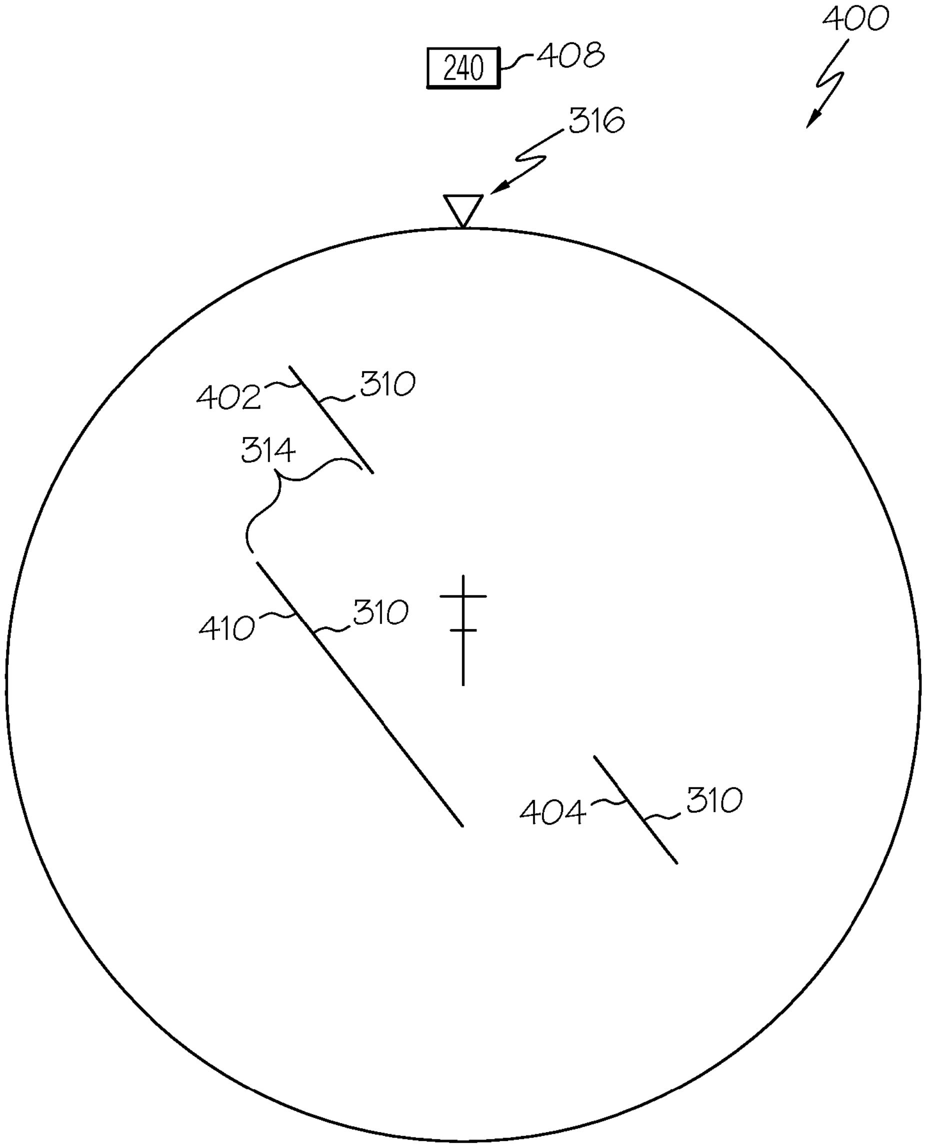
FIG. 4 is an exemplary image that may be rendered on the flight display system of FIG. 1.

FIG. 4 is a display 400 for presenting the runway centerline line vector 310 and the aircraft heading line vector 316. The runway centerline line vector 310 in the displayed preferred exemplary embodiment comprises a first portion 402, and a second portion 404 aligned with, and spaced from (by a spacing 406), the first portion 402. As presented, the display 400 indicates that the aircraft heading, represented by the aircraft heading line vector 316 is right of the runway centerline line vector 310, thus showing that the aircraft heading is more in magnitude than the runway heading. The aircraft position offset from the runway centerline is visualized by the offset 314 of the center portion 410 of the runway centerline line vector 310 from the first and second portions 402, 404. The pilot would have to decrease heading magnitude (steer left) in order to correct the aircraft heading to match the runway heading. In order to maintain the aircraft heading equal to the runway heading, the aircraft line vector 316 and the runway centerline line vector 310 should be aligned together with the inner part of the runway heading line vector indicator. Optionally, the runway heading, for example 240 degrees, may be displayed in the digital display 408.

Therefore, a system and method are provided for enhancing a pilot's ability to maintain orientation and position on a runway during takeoff roll by displaying a runway centerline line vector and an aircraft heading vector on an electronics aircraft display. By referencing the display, the pilot may adjust the aircraft heading to maintain the aircraft on the runway.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An aircraft vision system in an aircraft taking off on a runway, the aircraft vision system comprising:

a sensor configured to capture an image of the runway;

a processor coupled to the navigation system and the sensor and configured to:

determine a centerline line vector of the runway from the image using dedicated feature detection algorithms;

determine a position and heading of the aircraft;

determine a runway heading from the centerline line vector based on features determined by the dedicated feature detection algorithms;

determine deviation of the aircraft heading from the runway heading; and create an aircraft line vector representing the aircraft position and heading; and a display coupled to the processor and configured to display the centerline line vector and the aircraft line vector, thereby providing an indication of a direction the aircraft should be turned to maintain the aircraft in the center of the runway.

2. The aircraft vision system of claim 1 wherein the processor is further configured to detect left and right edges of the runway from the image and the centerline line vector is determined by interpolating between the left and right edges.

3. The aircraft vision system of claim 1 wherein the processor is further configured to detect lighting along the left and right edges of the runway from the image and the centerline line vector is determined by interpolating between lighting along the left and right edges.

4. The aircraft vision system of claim 1 wherein the processor is further configured to detect lighting along a centerline of the runway from the image and the centerline vector is determined from the detected lighting.

5. The aircraft vision system of claim 4 wherein the display is further configured to display the runway heading.

6. The aircraft vision system of claim 4 wherein the sensor comprises an infrared camera.

7. The aircraft vision system of claim 4 wherein the sensor comprises one of the sensors selected from the group consisting of a millimeter-wave imager or a millimeter-wave radar.

8. The aircraft vision system of claim 1 wherein the display is further configured to display the angular deviation of the aircraft heading from the centerline line vector as a first portion, and a second portion aligned with, and spaced from the first portion, and the inner part aligned between the first and second portion for the visualization of the aircraft position offset from the runway heading.

9. The aircraft vision system of claim 1 wherein the processor is further configured to enhance the image prior to determining the centerline line vector.

10. The aircraft vision system of claim 1 wherein Hough Transform is used in the process of determining the centerline vector of the runway.

11. The aircraft vision system of claim 1 wherein the processor is further configured to:

determine a position offset of the aircraft from the runway centerline; and wherein the display is further configured to:

display the position offset.

12. An aircraft vision system for maintaining aircraft positioning on a runway during takeoff, the aircraft vision system comprising:

a sensor configured to capture an image of the runway including at least one of runway edges, runway edge lights, and runway centerline lights;

a processor coupled to the navigation system and the sensor and configured to:

determine a centerline line vector of the runway from the image using dedicated feature detection algorithms and based on the one of runway edges, runway edge lights, and runway centerline lights;

determine a position and heading of the aircraft;

determine a runway heading from the centerline line vector based on features determined by the dedicated feature detection algorithms; and create an aircraft vector representing the aircraft position and heading; and a display coupled to the processor and configured to display the centerline line vector and the aircraft line vector, thereby providing an indication of a direction the aircraft should be turned to maintain the aircraft in the center of the runway.

13. The aircraft vision system of claim 12 wherein the sensor comprises an infrared camera.

14. The aircraft vision system of claim 12 wherein the sensor comprises one of the sensors selected from the group consisting of a millimeter-wave imager or a millimeter-wave radar.

15. The aircraft vision system of claim 12 wherein the display is further configured to display the centerline line vector as a first portion, and a second portion aligned with, and spaced from the first portion, and the aircraft line vector aligned between the first and second portion when the aircraft heading equals the runway heading, and to one side or the other of the runway centerline line vector when the heading differs from the runway heading.

16. The aircraft vision system of claim 12 wherein the processor is further configured to:

determine a position offset of the aircraft from the runway centerline; and wherein the display is further configured to:

display the position offset.

17. A method for displaying an aircraft runway environment in an aircraft, comprising:

capturing an image of the runway having left and right edges by a sensor;

determining a centerline line vector of the runway from the image by a processor using dedicated feature detection algorithms;

determine a position and heading of the aircraft;

determining a runway heading from the centerline line vector based on features determined by the dedicated feature detection algorithms;

determining a deviation of the aircraft heading from the runway heading by the processor;

creating an aircraft line vector representing the aircraft position and heading by the processor; and displaying the centerline line vector and the aircraft line vector by a display, thereby providing an indication of a direction the aircraft should be turned to maintain the aircraft in the center of the runway.

18. The method of claim 17 further comprising detecting by the processor the left and right edges of the runway from the image and the centerline line vector is determined by interpolating between the left and right edges.

19. The method of claim 17 further comprising detecting by the processor lighting along the left and right edges of the runway from the image and the centerline line vector is determined by interpolating between lighting along the left and right edges.

20. The method of claim 17 further comprising detecting by the processor lighting along a centerline of the runway from the image and the centerline vector is determined from the detected lighting.

21. The method of claim 17 wherein the capturing step comprises using an infrared camera.

22. The aircraft vision system of claim 17 wherein the sensor comprises one of the sensors selected from the group consisting of a millimeter-wave imager or a millimeter-wave radar.

23. The method of claim 17 wherein the displaying step displays the centerline line vector as a first portion, and a second portion aligned with, and spaced from the first portion, and the aircraft line vector aligned between the first and second portion when the aircraft heading equals the runway heading, and to one side or the other of the runway centerline line vector when the heading differs from the runway heading.

24. The method of claim 17 further comprising enhancing by the processor the image prior to determining the centerline line vector.

25. The method of claim 17 further comprising:

determining by the processor a position offset of the aircraft from the runway centerline and displaying the position offset.

* * * * *